Fig. 1.

Dec. 1, 1931.  J. W. BRYCE  1,834,767
TABULATOR WITH INDIVIDUAL COLUMN RESET
Filed April 22, 1927   8 Sheets-Sheet 4

Inventor
JAMES W. BRYCE
By his Attorney
W. M. Wilson

Dec. 1, 1931.  J. W. BRYCE  1,834,767
TABULATOR WITH INDIVIDUAL COLUMN RESET
Filed April 22, 1927  8 Sheets-Sheet 6

Inventor
JAMES W. BRYCE
By his Attorney
W. W. Wilson

Dec. 1, 1931.  J. W. BRYCE  1,834,767
TABULATOR WITH INDIVIDUAL COLUMN RESET
Filed April 22, 1927   8 Sheets-Sheet 7

Inventor
JAMES W. BRYCE
By his Attorney

Patented Dec. 1, 1931

1,834,767

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

TABULATOR WITH INDIVIDUAL COLUMN RESET

Application filed April 22, 1927. Serial No. 185,877.

The invention concerns accounting machines and more particularly mechanism for controlling total printing and resetting of the accumulating elements on such machines. The invention is particularly concerned with a machine including a plurality of accumulators individual to denominational orders and in which total printing may be effected from any individual accumulator with or without resetting and also in which resetting of any individual accumulator may be effected either with or without total printing.

In a well known commercial type of printing tabulator the accumulating elements are independently controlled from different columns of record cards for entering items. The items are entered by starting rotation of the adder elements of the accumulators at differential times corresponding to the item which is to be entered and the entering operation is terminated by disconnecting all the adder elements simultaneously from their driving mechanism so that all stop together at the end of a machine cycle. Resetting of the accumulators on these machines is also effected by starting rotation of the adding elements at differential times in accordance with the data that they register at the beginning of the reset and terminating the reset for all elements simultaneously toward the end of the reset cycle when the elements reach zero or home position. The feature of terminating all tabulating and resetting operations simultaneously is a very desirable one as it permits a common member to disconnect the elements from their driving mechanism and this common member may be very accurately timed and its operation made certain. The accumulators of these machines are usually assembled into banks and each bank may be independently reset but heretofore it has not been possible to reset each individual denominational order adding element independently.

The present invention contemplates providing reset mechanism which may select any individual denominational order element for reset regardless of its position in the machine and in which nevertheless the feature of terminating the reset operation simultaneously for all accumulator elements is retained. The invention further contemplates driving the adder elements of the accumulators from a common drive shaft for entry of items and resetting but which is driven from separate sources of power for the entering and resetting operations.

A preferred embodiment of the invention provides individual clutches for the accumulators which are operated in the same manner for both the entry of items and resetting and which are likewise unclutched by a common element at the end of either an entering or resetting operation. Each accumulating element is provided with a separate counter magnet whose energization in accordance with differentially located perforations on a record card permits operation of a clutch shifting lever to cause engagement of the clutch elements with consequent rotation of the adder element. At the end of the entering cycle all the clutches are kicked out simultaneously by a reciprocable plate. These features are common to the commercial machine referred to. In the present case it is proposed to use the same clutches, clutch shifting levers and clutch kick out plate for the resetting operation. The magnets in this case are energized at differential times corresponding to the position of the counter elements at the beginning of the reset operation, the differential times of energization of the magnets conforming to the complement of the item which is standing on the accumulator, from which it results that the counter elements all reach zero position simultaneously and provision is made for operating the kick out plate at this time to disengage the clutches and leave the elements standing at zero position. The resetting as well as the tabulating are controlled from an electromagnet from which it follows that any element may be selected either for receiving an entry or resetting without reference to any other element as it is only necessary to provide a switch or plug and socket connection in the several circuits which control the counter magnets for tabulating and resetting.

In the specific embodiment of the invention chosen for illustration a stationary commutator is provided which has ten segments corresponding to the ten registering positions of the accumulator adding wheel. A brush geared to the adding wheel engages the segments and always rests upon a segment corresponding to the registering position of the adding wheel. A second brush normally rests on the commutator segment corresponding to the zero position of the adding wheel. When totaling is desired the counter wheel with its associated brush is rotated through ten points or one complete revolution bringing the wheel and the brush back to its original position. As the brush passes the zero commutator segment a printing circuit is closed through the stationary brush to the usual printing call magnets and the movement of the type bars is synchronized with the movement of the adding wheel and brush so that the proper type will be selected for printing to register the item originally standing on the adding wheel. Resetting of the elements, if desired, is effected after this total printing operation. In this case the second brush is rotated to cover the commutator segments in order and when it reaches the segment with which the first brush is in engagement closes a circuit to the counter magnet of the associated counter wheel. The two brushes and the counter wheel then move together until they reach zero position when the clutches controlling the counter wheel and the second brush are kicked out simultaneously leaving the counter element and both brushes in normal zero position. This resetting operation is also electrically controlled and is likewise adapted to individual selection of each adding wheel.

While the invention has been disclosed in connection with an electrical machine and this forms the preferred embodiment at present it is obvious that the same results may be obtained mechanically, if desired.

The principal object of the invention is to provide new and improved construction and arrangement of parts in the resetting and total taking mechanism of an accounting machine.

A more specific object of the invention is to provide for resetting individually denominational order adding elements in an accounting machine in which the reset is terminated simultaneously on all elements involved.

Another object of the invention is to provide an accounting machine in which there is common mechanism for terminating entering and resetting operations.

Another object of the invention is to provide an accounting machine in which the resetting operation terminates simultaneously on all elements involved and in which total printing may be effected with or without reset on each denominational order adding element.

Another object of the invention is to provide an accounting machine in which total printing is effected from the adding elements while the latter are in motion and to further provide for resetting of the elements after total printing has been effected.

Still another object of the invention is to provide an accounting machine in which total printing is effected from the adder elements while they are in motion and in which the total printing operation may be followed by a resetting operation and to further provide selective means for selecting any denominational order adder element for total printing or reset or both.

Another object of the invention is to provide an accounting machine adapted to list items and print totals through common control mechanism operated by the adder elements.

Another object of the invention is to provide an accounting machine with provisions for listing and total printing selectively on any denominational order adder elements and in which the listing and total printing is controlled by common mechanism operated by the adder elements.

Another object of the invention is to provide an accounting machine in accordance with the prior objects which is provided with a plurality of adder elements with provisions for associating any of the elements together to form desired accumulator banks and in which such formed banks may be selected to print totals or reset or both independently of the other elements of the machine not included in the bank.

The invention may be more clearly understood from the following detailed description which should be read in connection with the accompanying drawings in which the same reference numerals refer to the same parts throughout the several views and in which.

Figure 1:
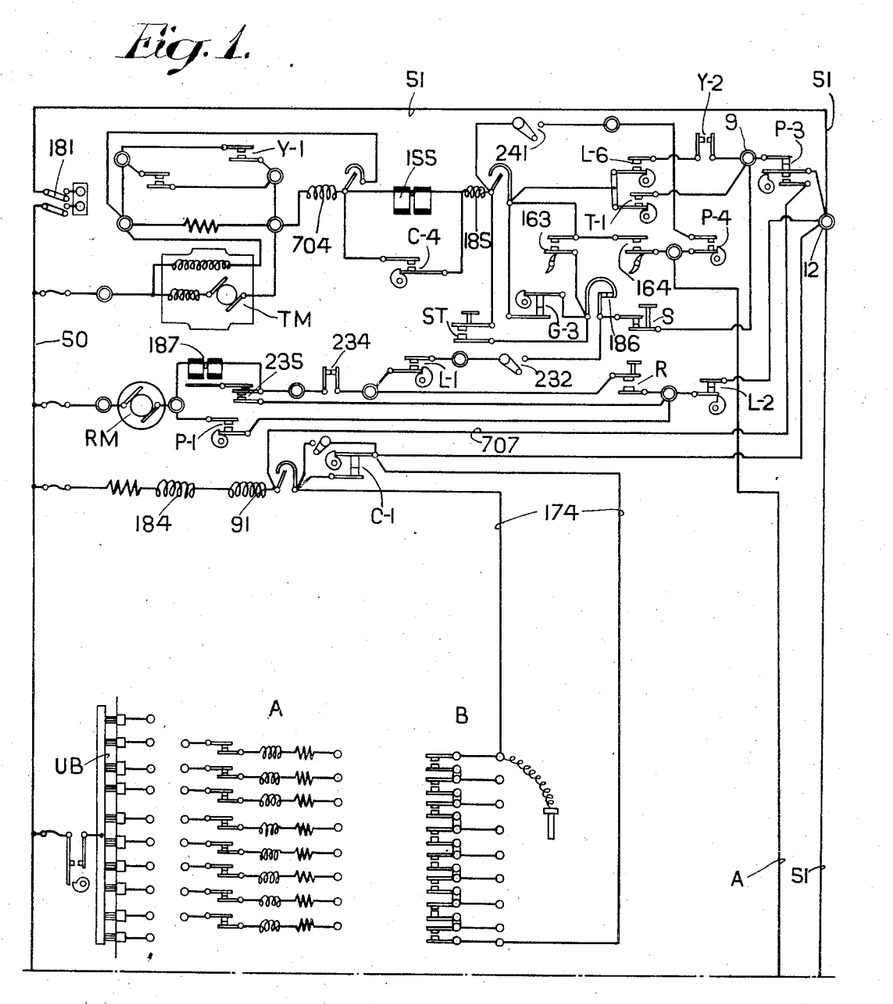
Figs. 1 and 1a illustrate the circuit diagram for a machine according to the invention.

The invention has been shown as applied to a machine of the type disclosed in the copending application of Daly and Page Serial No. 6980, filed February 5, 1925, now Patent No. 1,762,145, dated June 10, 1930. The upper part of the circuit diagram in Fig. 1 is substantially the same as that shown in Fig. 26a of the Daly and Page application and reference may be had to that specification for a complete description of the operation of the machine. The explanation of the general circuit diagram in the present case will be limited to what is necessary for a complete understanding of the present invention. It may be assumed that cards have been placed in the magazine and that tabulation of the items on the cards is desired with an automatic total at the end of each card group. The switch 181 is closed to energize the main supply lines 50 and 51. The machine must first be sent through a total and reset cycle for the purpose of setting up the motor control contacts 186 which are controlled by the motor control relay 184. The reset key R is closed momentarily energizing the reset motor RM through a circuit extending from line 50 to reset motor RM and reset clutch magnet 187 thence to contacts 234 which are operated by the card feed clutch and closed when cards are not feeding, thence through the reset key R, contacts L2 closed at the normal D or home position of the machine to binding post 12 in the line 51. Energization of the reset clutch magnet 187 causes the reset motor to drive the usual reset shaft through a single revolution which effects clearing on all adding units on the machine which are set for clearing. Energization of this magnet also closes contacts 235 which shunt the reset contacts R out of the reset motor circuit so that the reset key need be held down only instantaneously. Shortly after the reset motor starts the cam contacts P1 close, shortcircuiting and deenergizing the reset clutch magnet 187, whereby after a single revolution the reset clutch will disengage. After a single cycle the reset motor RM will likewise be deenergized due to the reopening of cam contacts P1. During this reset cycle the lower contacts P3 close and then open again. The closure of these lower contacts energizes the motor control relay magnet 184 through a circuit extending from the line 50 to magnet 184, stick relay coil 91, wire 707, lower contacts P3, closed temporarily, to binding post 12 in the line 51. The closure of the contacts of stick relay 91 shunts the lower contacts P3 out of the circuit of motor relay magnet 84, the shunting circuit extending through the contacts of relay 91, the cam contacts C1, closed when the tabulating section of the machine is in D position, to contact binding post 12 to line 51. After once being energized then the motor relay magnet remains energized maintaining the contacts 186 closed. The cam contacts C1 open once during each card cycle but at the time when they open a shunt circuit is prepared through the auto control circuit 174 as long as the controlling perforations on successive cards agree. When the card group changes and auto control circuit 174 fails to make, the motor relay is deenergized on account of the opening of contacts C1 but as the tabulating of each group is ordinarily followed by a total and reset cycle the relay 184 is again energized to close its contacts 186 during this reset cycle. After the switch 181 has once been closed then and the initial reset cycle manually started the tabulator may be started at any time by simply depressing the start key ST. The tabulating motor TM is then energized through a circuit extending from the line 50 through tabulator motor TM, relay coil 704, card feed clutch magnet 155 and relay coil 185 to start key contacts ST, thence through motor relay contacts 186 and stop key S to binding post 9, and through upper contacts P3, normally closed, to binding post 12 in the line 51. The energization of card feed clutch magnet 155 causes the first card to feed from the magazine. If the cards have just been placed in the magazine and no card is under the lower brushes the machine will stop at the end of the first cycle due to the opening of the cam contacts G3. The start key must then be depressed again to operate the tabulator through another cycle which will feed the first card to the lower brushes and incidentally close the lower card lever contact 163. Tabulating thereupon continues through successive cycles as the contacts G3 are now shunted by the lower lever contacts 163 as long as cards are feeding past the lower brushes. At the end of the card group the auto control circuit 174 fails to make and the contacts C1 opening toward the end of the cycle deenergize the motor control relay 184 which opens its contacts 186 and stops the tabulating motor. Shortly before the end of each tabulating cycle the cam contacts L1 close and during the last tabulating cycle at the end of a card group contacts 234 also close owing to the disengagement of the card feed clutch. A circuit is thus closed for the reset motor and reset clutch extending from the line 50 through reset motor RM, reset clutch magnet 187, contacts 234, cam contacts L1, switch 232, closed for automatic totaling, stop key S to binding post 9, and through upper cam contacts P—3 to binding post 12 in the line 51. The machine then performs a total and reset cycle as previously described, at the end of which tabulating on the succeeding card group will be automatically initiated owing to the closure of cam contacts P4 toward the end of the reset cycle. The circuit for the tabulating motor in this case extends from line 50, to tabulating motor TM, relay 704, card feed clutch magnet 155, relay 185, switch 241, cam contacts P4, upper and lower card lever contacts 164 and 163 to motor control relay contacts 186, thence through stop key S and upper contacts P3 to binding post 12 in line 51. This explains briefly the complete operation of the machine and it will be understood that as the cards feed beneath the lower brushes the data represented by their index point perforations will be picked off by the lower brushes and entered into the proper accumulators and accumulated with listing of each item if desired.

Figure 1A:
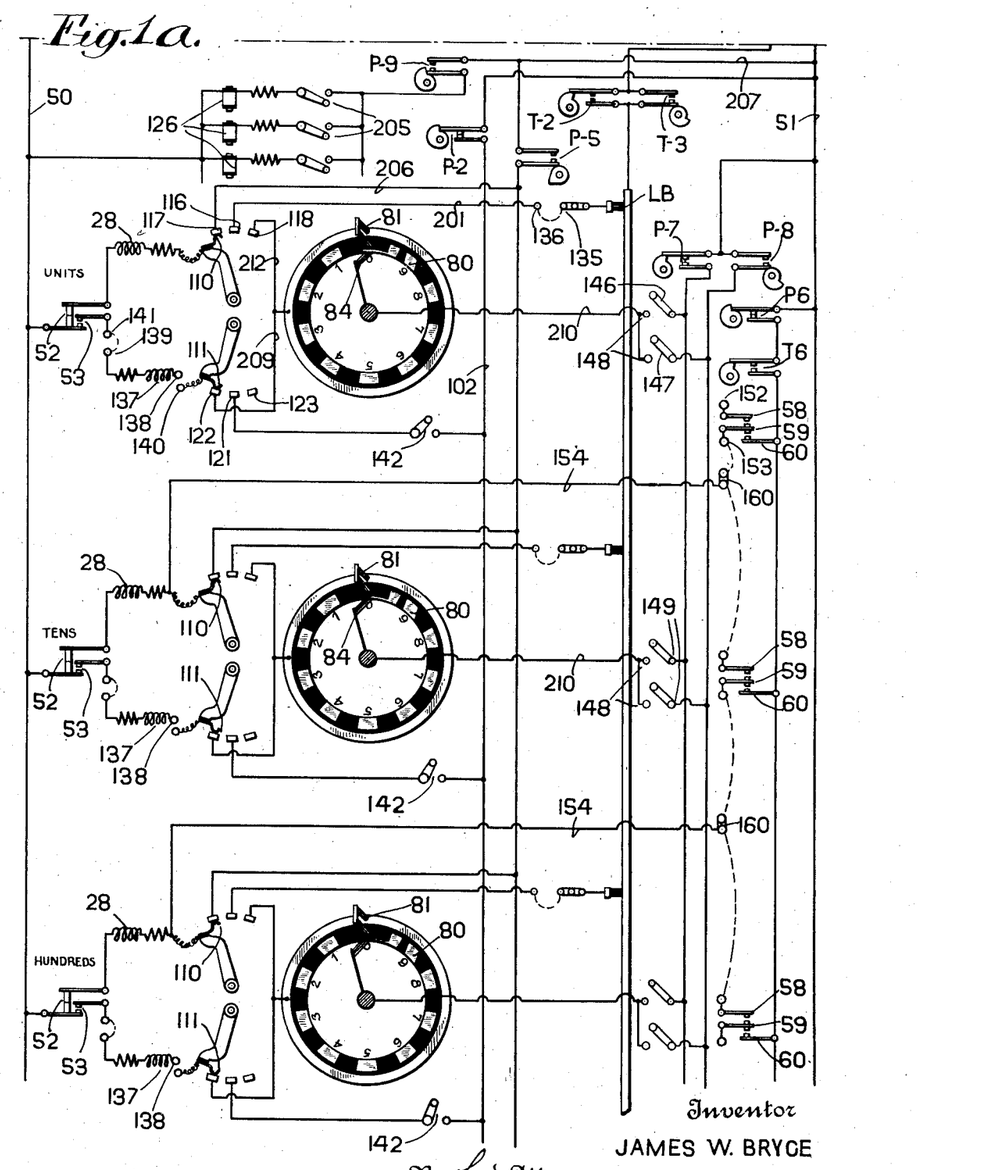

Before proceeding with the explanation of the lower part of the circuit diagram shown in Fig. 1a the mechanical features by means of which tabulating, totaling, and reset is effected in accordance with the present invention will be explained in connection with Figs. 2, 3, 4, 5, 10, 11 and 12.

Figure 2:
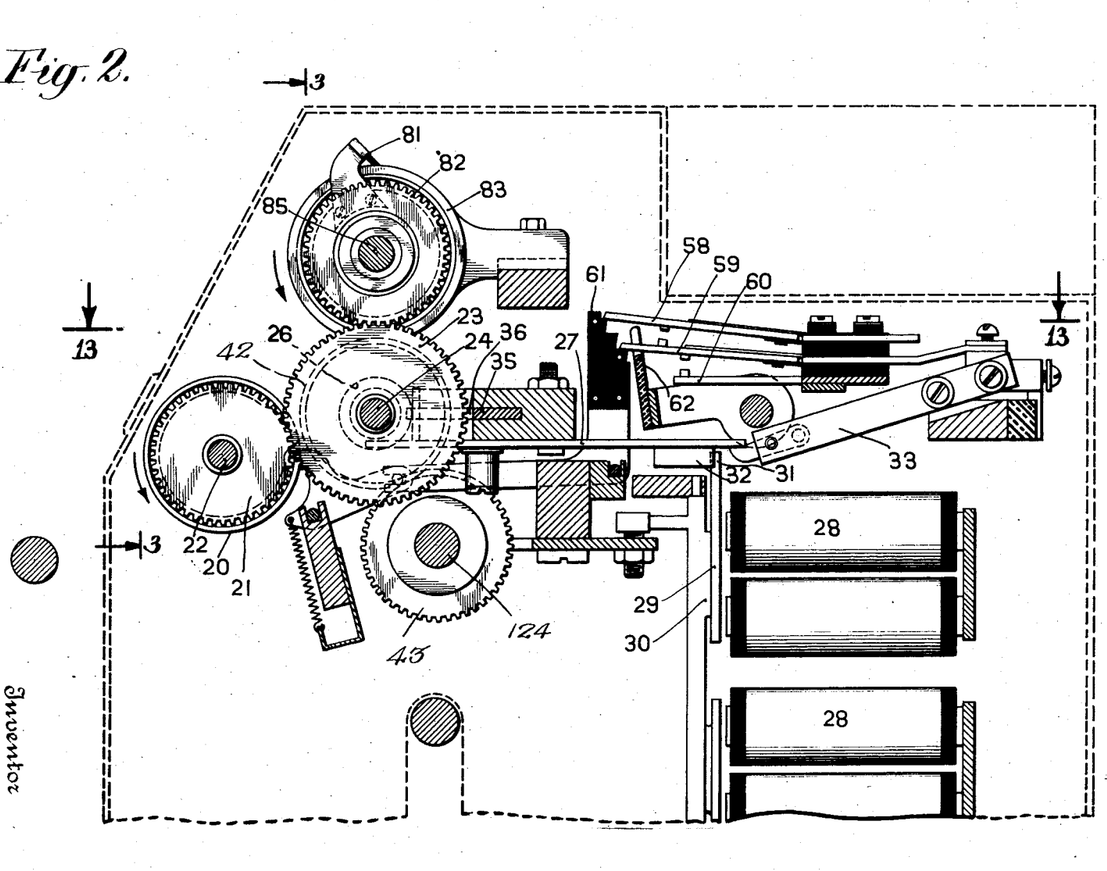
Fig. 2 is a sectional view through the counter section of the machine.
Figure 3:
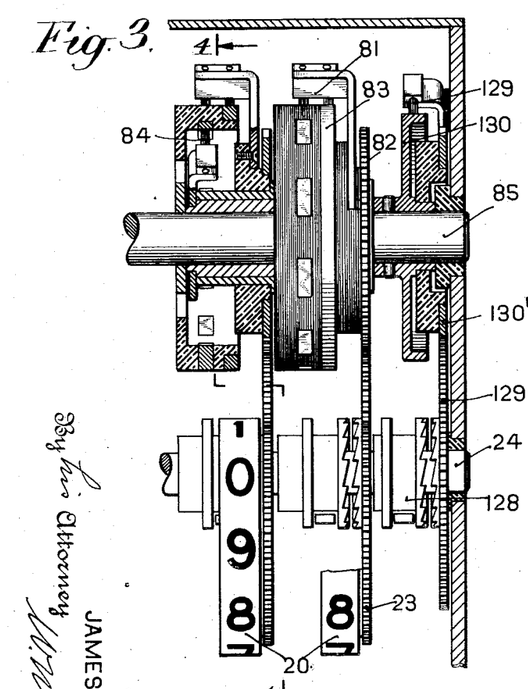
Fig. 3 is a detail section illustrating the counter elements with their associated commutators and brushes for controlling total taking and resetting.
Figure 4:
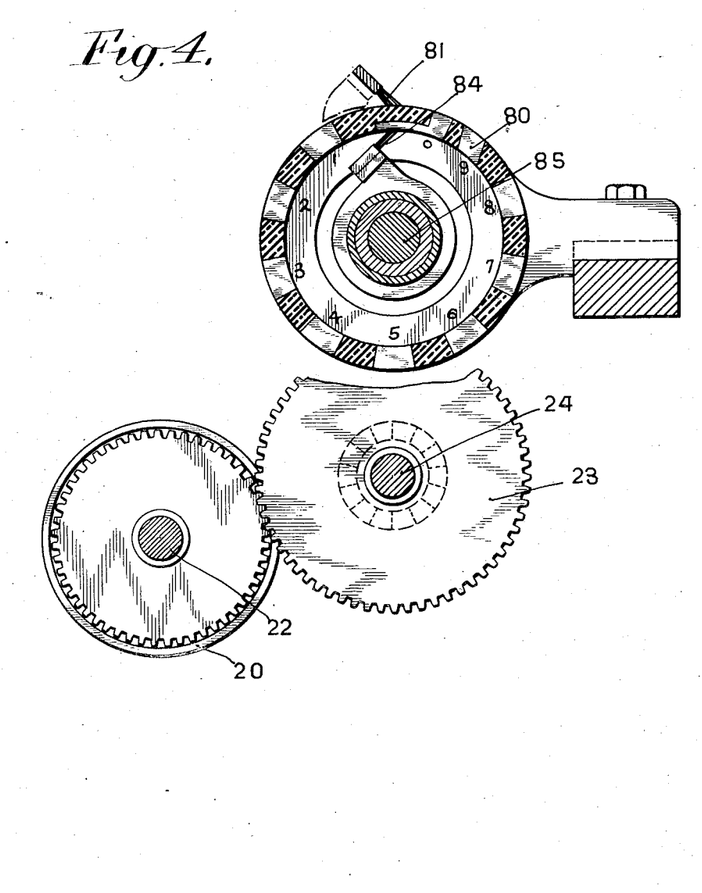
Fig. 4 is a section on line 4—4 of Fig. 3.
Figure 5:
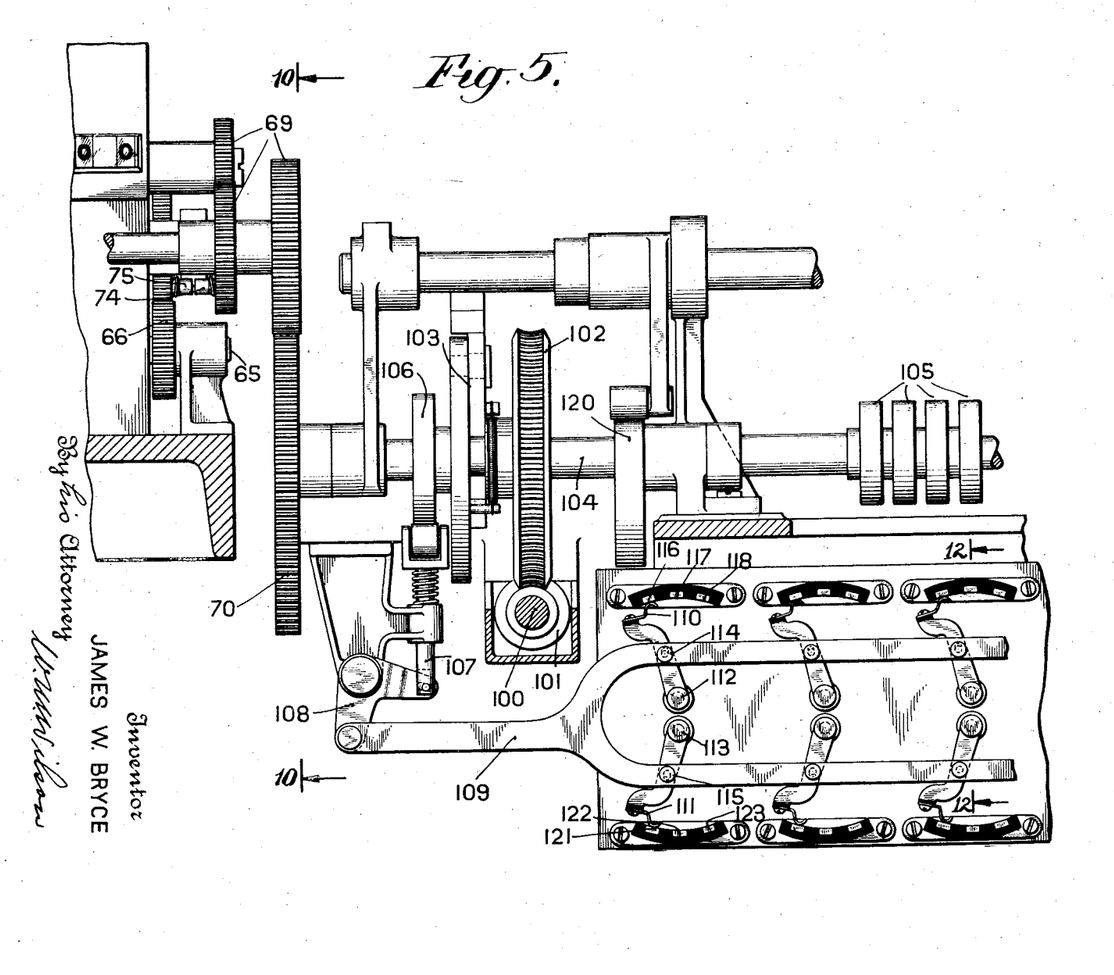
Fig. 5 is a detail of the mechanism for driving the counters during resetting operation.
Figure 6:
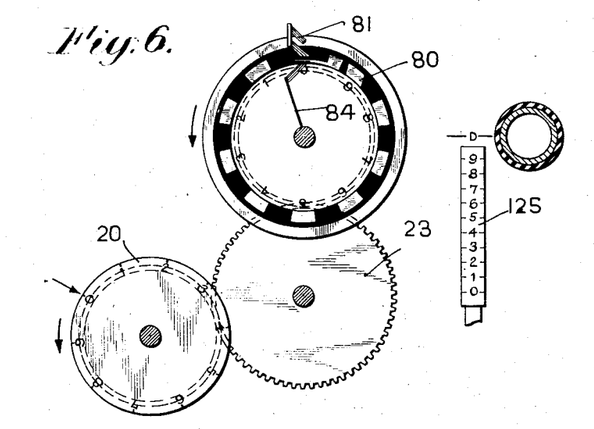
Figs. 6, 7, 8 and 9 are schematic views of the counter elements and their commutators and brushes for explaining the total taking and reset operations.
Figure 13:
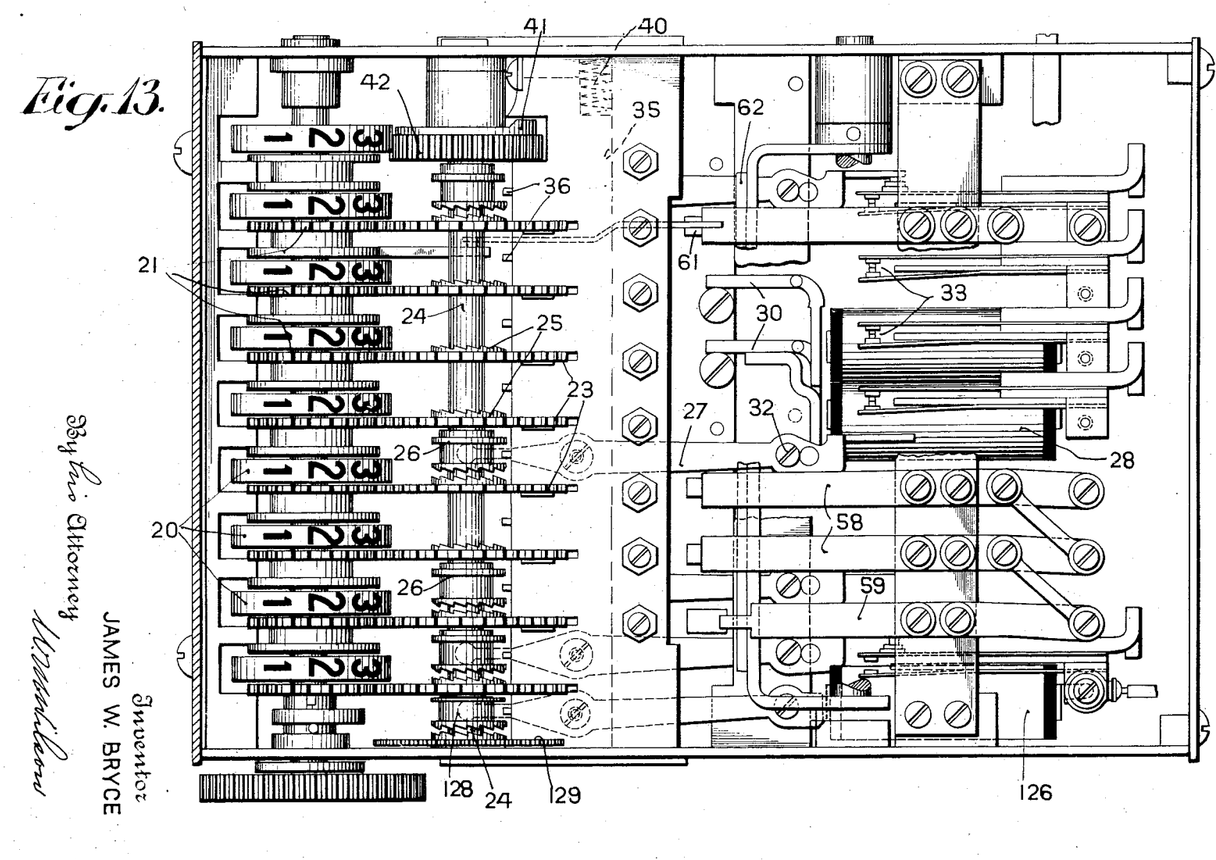
Fig. 13 is a section on line 13—13 of Fig. 2.

The counter or accumulating mechanism is illustrated in Figs. 2 and 13 and comprises the counter with electrical transfer disclosed in the U. S. patent to Lake No. 1,372,965, March 29, 1921. The counter wheels, having a series of digits marked on their peripheries, are indicated at 20. Each wheel has a gear 21 rigidly attached to it and the gear and wheel are free to rotate upon a shaft 22. Each gear 21 meshes with a gear 23 which is freely mounted on the counter shaft 24 of the machine. Each gear 23 has an integral hub portion 25 with clutch teeth formed on its face adapted to cooperate with corresponding clutch teeth on a sleeve 26 having a peripheral groove into which extends a pivoted shift lever 27. The sleeve 26 is splined to the shaft 24 and rotates with it but is free to slide lengthwise of the shaft to permit its clutch teeth either to engage or disengage the teeth on the hub portion 25. An individual counter magnet 28 controls the operation of each counter wheel. Each magnet 28 is provided with an armature 29 mounted on a pivoted rod 30 so that when the armature is attracted by its magnet the rod 30 rotates. An extension 31 on the armature supporting structure engages a latch plate 32 on the lever 27 and holds the latter in unclutching position against the action of a flat spring 33. When the magnet 28 is energized its armature is rocked releasing the extension 31 from the latch member 32 and permitting the shift lever 27 to rotate about its pivot and force the clutch member 26 in clutching engagement with the hub 25 on gear 23. The gear 23 thereupon rotates with the tabulating shaft 24 and rotates the corresponding counter wheel 20. The magnet 28 is energized momentarily from the analyzing brush circuit in response to perforations representing different digits, and its energization will, of course, be timed in accordance with the location of the perforations on the controlling record. The beginning of rotation of the counter wheel 20 therefore corresponds in time to the passage of a given perforation under the analyzing brushes. Toward the end of the machine cycle any clutch which has been engaged by energization of its counter magnet during the cycle will be disengaged by a plate 35 carrying extensions 36 projecting into the annular grooves on the slidable clutch members 26, these extensions 36 being narrower in width than the annular grooves 26. The plate 35 is urged to the right (in Fig. 13) by a spring 40 and its movement under the action of the spring is governed by a cam 41 mounted on a driving gear 42 of the counter shaft 24. As the counter shaft rotates the cam permits the plate 35 to move to the right but this movement is not sufficient to cause engagement of the clutch members. At a given point in the cycle the cam moves the plates to the left and any clutch which is engaged at this time will be disengaged by the extensions on the plate. This disengagement is timed to cause each register wheel which has been rotated during the cycle to register the character or digit represented by the perforation which caused the energization of its counter magnet. The spring 33 forms one contact of a pair 52 (see Fig. 1a) which serves the purpose of breaking the controlling circuit through the analyzing brushes as soon as the magnet is energized to prevent sparking at the brushes. This spring also controls the contacts 53 (see Fig. 1a), which govern the circuit of the printing magnet for listing the items entered into the counter elements.

The usual electrical transfer contacts whose operation is fully explained in the Lake patent are indicated at 58, 59 and 60. Through linkage connected to the counter mechanism which is fully explained in the patent but shown in fragmentary form in the present disclosure a stepped cam member 61 permits contacts 58 and 59 to engage when the corresponding counter wheel passes to its nine position and opens these contacts and permits contacts 59 and 60 to close when the corresponding counter wheel passes from its nine to its zero position. These contacts are restored at the end of the cycle by a bail 62.

Figures 10, 11, 12, 14:
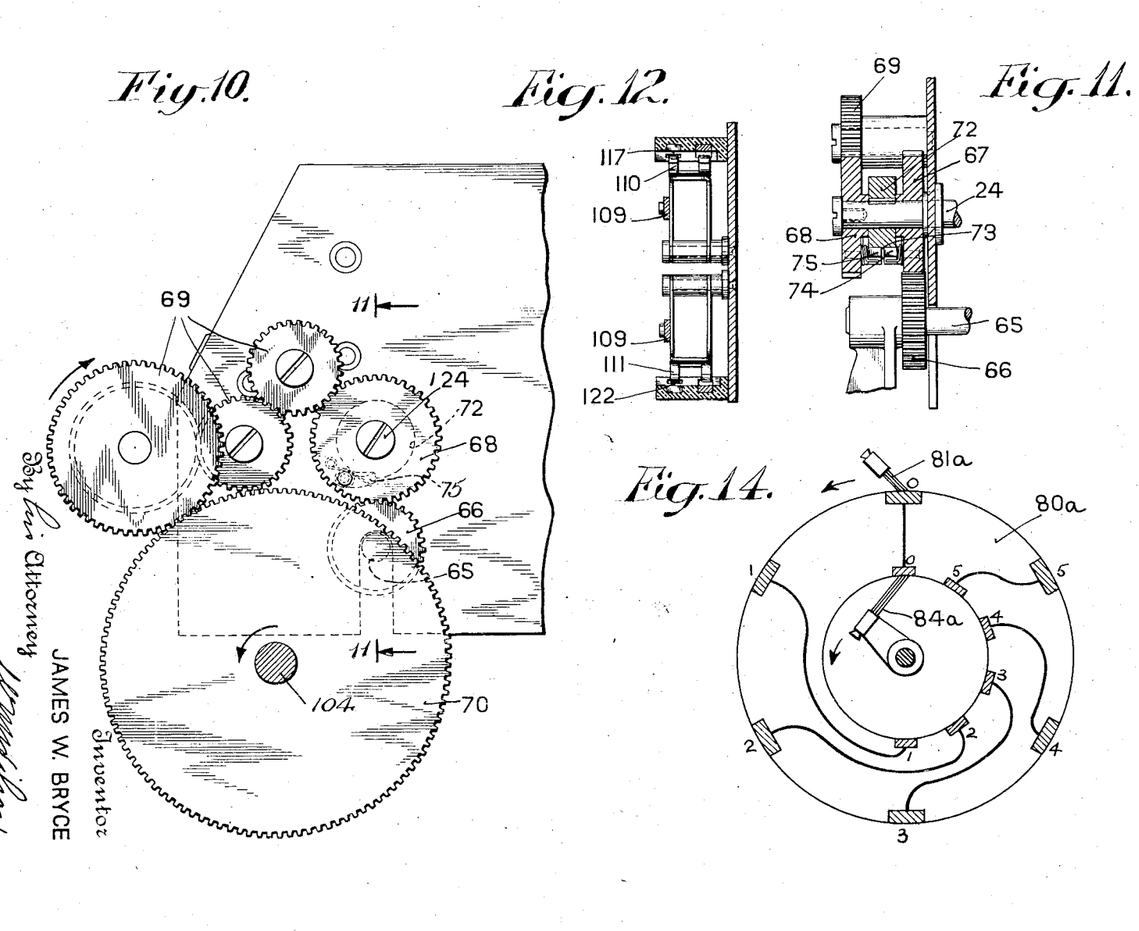
Fig. 10 is a detail illustrating the separate drives of the counter shaft during tabulating and total printing and reset operations.
Fig. 11 is a section on the line 11—11 of Fig. 10.
Fig. 12 is a section on line 12—12 of Fig. 5.
Fig. 14 is a diagrammatic illustration of a fraction counter element according to the insert.

The counter shaft 24 is used in the present case for resetting as well as for tabulating and for this purpose is provided with two separate drives. Referring to Figs. 10 and 11, the tabulating shaft of the machine is shown at 65 driven by the tabulating motor during tabulating cycles in the well known manner. The drive in this case consists of a gear 66 mounted on the tabulating shaft and meshing with a gear 67 freely mounted on the counter drive shaft 124. A second gear 68 is also mounted on the counter drive shaft 124 meshing through an intermediate train indicated generally at 69 with a large gear 70 on the total shaft 104 of the machine which as usual is driven by the reset motor through a one revolution clutch. The shaft 124 has a disc 72 splined to it provided with a notch 73. A pawl 74 pivoted on the gear 67 and a pawl 75 pivoted on the gear 68 independently cooperate with the notch 73 to operate the counter drive shaft 124. This permits the shaft 124 to be driven either by the tabulating shaft 65 or by the reset shaft 71, and the drive of neither interferes with the other. A complete totaling and reset operation as will appear later requires two revolutions of the counter shaft 24 and the proper gear ratio is provided in the train 69 to cause the shaft 124 to rotate twice for every revolution of the total shaft 104. The counter shaft 24 is driven from the counter drive shaft 144 through gears 42 and 43 in one to one ratio.

Total printing and reset are controlled by a stationary commutator 80 (Figs. 3 and 4) provided with segments 1, 2, 3, 4, etc., there being ten segments each corresponding to a digit on the counter wheel when the latter is in zero position or otherwise expressed, each corresponding to a given point in the tabulator cycle. An outer brush structure 81 is mounted on a gear 82 (Figs. 2 and 3) which meshes with gear 23 on the counter shaft 24 so that as the counter element rotates the brush 81 also rotates and corresponds at all times with the position of the counter wheel 20, making electrical contact at each position of the counter wheel between one of the segments 1, 2, 3, etc., and an annular contact 83 of the commutator. An inner brush 84 is fixed to shaft 85 which is normally stationary but which is rotated during the latter part of the total and reset operation as will be hereinafter explained.

Total printing and reset are effected as hereinbefore explained by energization of the reset motor RM and magnet 87 (see Fig. 1). The motor RM drives the shaft 100 (Fig. 5) and through worm 101 and worm wheel 102 drives one element of a one revolution clutch indicated generally at 103. Energization of the reset magnet 187 causes this clutch to engage to rotate the total shaft 104 of the machine through a single revolution. The shaft 104 rotates the P cams 105, and cam 120 for raising the usual type bars and the gear 70 which, of course, rotates the counter drive shaft 124 (see Fig. 10) for two revolutions during the first of which total printing is effected and during the second of which reset on any desired units is effected. The reset shaft also by means of cam 106, link 107 and bell crank 108, oscillates a yoke member 109. The yoke controls contacts 110 and 111 which are pivoted at 112 and 113, respectively. The pivoted supporting structures of these contacts are provided with slots cooperating with pins 114 and 115 on the yoke member 109. The contact 110 cooperates with three contacts 116, 117 and 118 being normally in engagement with the contact 116 but moved into engagement with contact 117 during the first half revolution of the shaft 104, which is the total printing portion, and moved into engagement with the contact 118 during the second half of the revolution of the shaft 104, which is the reset portion. Contact 111 is similarly moved to engage contacts 121, 122 and 123.

Figure 7:
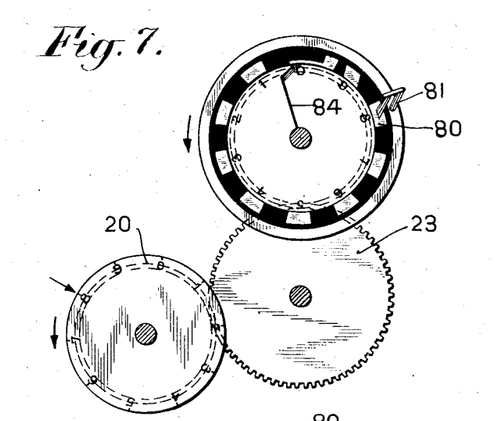
Figure 8:
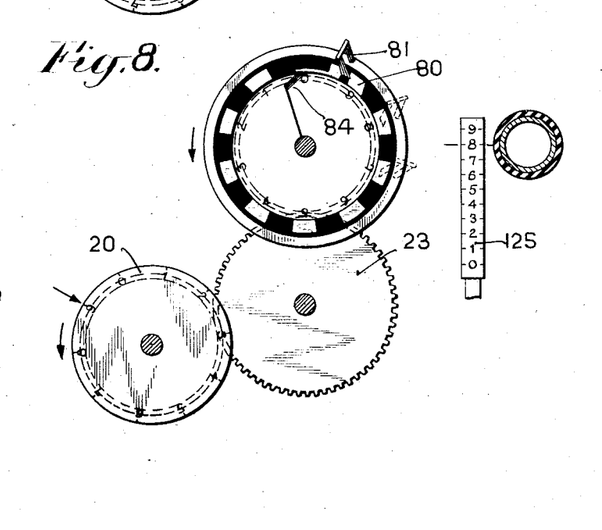
Figure 9:
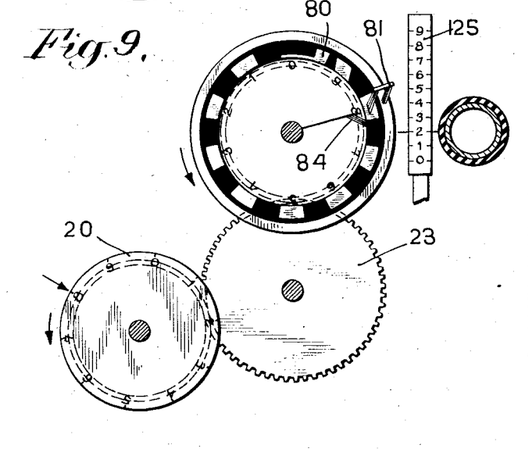

The totaling operation may be understood from Figs. 6, 7, 8 and 9. It will be recalled that the brush 81 rotates with the counter wheel and is therefore always in engagement with a commutator segment corresponding to the position of the counter wheel. Totaling is initiated by simultaneous energization of the counter magnets 28 causing the counter wheels to rotate, this energization being timed so that the counter clutches will be disengaged at the end of ten points of machine operation or after one complete revolution of the counter wheels. The counter wheels in this case are driven by the counter shaft 24 through its driving connection with the total shaft 104 and the clutches are kicked out by the plate 35 as in tabulating. At the end of this revolution the counter wheels register exactly what they did before the operation started and the reset shaft 104 has made one-half of a revolution. The printing control circuit is established by the brush 81 as it passes zero position, the circuit extending through the brush 84 which during this first revolution is stationary. The impulses for starting the counters are given as the type bars 125 begin to rise. In Fig. 7 the outer brush 81 is in engagement with the commutator segment 8 showing that the adding wheel is registering 8. The counter wheel starts to rotate carrying the brush 81 with it and incidentally the corresponding type bar begins to rise. The brush 81 moves from the 8 to the 9 commutator segment while the type bar moves from its normal to its 9 printing position and the brush 81 passes from the 9 to the zero commutator segment while the type bar is passing from its 9 to its 8 registering position. At this point the printing circuit is established from the brush 81 through the zero commutator segment to the inner brush 84 and the printing magnet is energized to select the 8 type for printing. After this, of course, the brush 81 continues its revolution until it again reaches the 8 commutator segment where it will stop. Other numerals are printed in exactly the same manner.

The second half of the revolution of the total shaft 104 effects reset of any adding wheels on which it is desired. During the second half of the revolution of the total shaft the shaft 85 is rotated this being effected by clutch 128 (Fig. 3) similar in general form to the counter wheel clutches but which through gears 129 and 130 rotates the shaft 85. There is one of these clutches 128 provided for each counter bank and each is controlled by a magnet 126 (see Fig. 1a) which is energized at the proper time in the cycle to cause the counter shaft 24 to make one complete revolution before the clutch 128 is kicked out by one of the extensions on plate 35. The inner brushes 84 are energized through the shaft 85, a stationary brush 129 being provided in constant engagement with a disc 130 electrically connected to the shaft 85. The brush 84 then may be energized regardless of whether the shaft 85 is stationary or rotating. During this second half of the revolution of the total shaft the brushes 81 rotate covering the commutator segments in the order 1, 2, 3, etc. On each wheel except those in the zero position a circuit will be established through the outer brush 81 to the counter magnet of the corresponding wheel when the brush 84 reaches the commutator segment with which the outer brush 81 is in engagement. The inner brush 84 starts its revolution ten machine points ahead of the kick out by the plate 35. Each counter magnet then will be energized at the proper time in the cycle to enter its complement into the counter and bring it back to zero at which point its clutch is kicked out by the plate 35 and the counter wheel remains in the zero position. This will be clearer from a consideration of Fig. 9 in which the outer brush 81 rests on the 8 commutator segment showing that the counter wheel registers 8. The inner brush has rotated past the 1, 2, 3, 4, 5, 6 and 7 commutator segments covering seven points of machine operation and reaches the 8 segment to complete the counter magnet circuit through the brush 81 on the eighth point of machine operation or two points previous to the kick out of the counter clutches by the plate 35. Two units are therefore entered into the counter wheel which originally registered 8, bringing it back to its zero position. The clutch 128 is also kicked out by the plate 35 to arrest the brushes 84 in zero position and these brushes remain on the zero commutator segments until another resetting operation is effected.

Before explaining the general operation, attention is directed to the fact that this tabulator is designed to total print either with or without resetting of the individual denominational order counter elements and that a universal interconnecting system is provided to permit any printing magnet to be associated with any counter element and any counter element to be connected to any analyzing brush for control thereby. Referring to Fig. 1a lower analyzing brushes indicated at LB are connected to sockets 135 and the contact 116 of each individual counter element is connected to a socket 136. Any socket 135 may be connected to the socket 136 of any counter unit to permit it to be controlled by any one of the lower brushes. The printing magnets 137 are connected to sockets 138 and 139 so that any one of them may be connected to any accumulating element for total printing through the sockets 140 and 141, respectively. A switch 142 is provided in series with the contact 121 so that listing may be suppressed, if desired, in connection with any printing magnet. It will be recalled from the previous explanation that the brush 84 is included in the total printing circuit as well as the resetting circuit. The circuit for total printing through this brush is controlled through cam contact P—7 and a switch 146 is provided in series with these contacts for each brush 84 so that when a total printing operation occurs each unit may total print or not as desired. The resetting circuit is controlled by cam contacts P—8 and a switch 147 is likewise provided in series with these contacts for each brush 84 so that each denominational order element may be reset or not regardless of whether total printing is effected from this element. Contacts P—7 close only during total printing operations and contacts P—8 close only during reset operations. The transfer contacts 58 and 59 are each connected to sockets 152 and 153, respectively while the wires 154 over which the transfer impulses are sent to the counter magnets of the counter elements terminate in double sockets 160. This arrangement is substantially similar to that disclosed in my copending application, Serial No. 721,504 filed June 21, 1924, now patent No. 1,732,499 dated Aug. 6, 1929, and permits the transfer system to be split between any two counter elements or to skip any desired counter element and also permits any counter element regardless of its position to be associated with any other counter element for transferring operations.

The general operation will now be described in connection with Fig. 1a of the drawings. This figure shows a single bank of accumulating elements consisting of a units, tens and hundreds element with transfer plugging, indicated by dotted lines, arranged for transfer from the units to the tens element and from the tens to the hundreds element. During tabulating operations the contacts 110 and 111 are in engagement with the contacts 116 and 121 respectively and the counter magnets 28 are energized in response to index perforations on the controlling cards through a circuit extending from line 50, contact 52, counter magnet 28 through contact 110 thence to contact 116 and through line 201 to sockets 136 and 135 to lower brush LB. The circuit from the lower brush is completed through the cam contacts T—2 or T—3 in the usual manner. Immediately upon energization of the counter magnet 28 the contacts 52 are opened to break this counting circuit and the contacts 53 are closed to energize the listing circuit. The latter extends from line 50, through contacts 53, printing magnet 137 to contacts 111 thence to contact 121 and through switch 142, wire 102 and contacts P—2 back to the other side of the line 51 in the usual manner. During tabulating, of course, the brush 81 rotates with the counter wheel and at any time engages a commutator contact corresponding to the reading of the counter. If totaling and reset are desired in connection with any counter, the switches 146 and 147 corresponding to that counter are closed and the switch 205 corresponding to the counter bank is closed to prepare the circuit of magnet 126 which controls clutch 128 shown in Fig. 3. These magnets and switches have been shown for three counter banks although only one bank consisting of three counter elements has been shown in the diagram. It will be understood, however, that the other magnets control similar banks. During the totaling cycle the contacts 110 and 111 shift to contacts 117 and 122, respectively. Contacts P—5 close to establish a circuit through the counter magnet 28 extending from the line 50 through contact 52, counter magnet 28 to contact 110 thence through contact 117, wire 206 and cam contacts P—5 back to the line 51 through wire 207. The contacts P—5 are timed to close so that the counter element will enter ten points or in other words make a complete revolution and return to its original position. The energization of the counter magnet 28 closes contacts 53 and a printing circuit is established as the brush 81 reaches the zero commutator segment. This printing circuit extends from line 50, contacts 53, printer magnet 137 to contact 111 thence through contact 122 and wire 209 to brush 81 and through commutator segment and brush 84 to wire 210 and through switch 146 and cam contacts P—7 to the other side of the line 51. The energization of the printer magnet in this case as previously explained selects the type for printing the item originally standing upon the counter element. During the second half of the revolution of the reset shaft the contacts 110 and 111 shift to contacts 118 and 123, respectively. Contact 123 is dead, that is no wire is attached to it and the printing circuit is thus opened during the reset operation. The contacts P—9 close at the beginning of this operation to energize the clutch magnets 126 to rotate the inner brushes 84. Each counter element remains stationary until its inner brush reaches the commutator segment on which the outer brush 81 is resting and at this time a circuit for the counter magnet is completed to enter the complement on the counter wheel and restore it to zero. The counter magnet circuit in this case extends from line 50, contacts 52, counter magnet 28 to contact 110, thence through contact 118 and wire 212 to outer brush 81 and through one of the commutator segments to inner brush 84 and through wire 210, switch 147 and cam contacts P—8 to the other side of the line 51. The counter clutches and the clutch 128 (Fig. 3) which effects operation of the inner brushes 84 are kicked out simultaneously by the plate 35 (Figs. 2 and 13) as the counter elements and the brushes 84 reach their zero position and the several elements remain in the position until a subsequent tabulating operation is performed.

The transfer system must be disabled during the total and reset operations as otherwise undesirable transfers would occur between the adding elements. A pair of cam contacts P—6 is provided in series with the usual transfer impulse contacts T—6 for this purpose. The contacts P—6 automatically open during the total and reset operations and no transfer impulses can reach the counter magnets during these operations. The contacts P—6 of course are normally closed during tabulating cycles.

The explanation of the invention has thus far been limited to a decimal system of progression in which the several counter wheels add and transfer in tenths. It is also applicable to systems which make use of fractions other than tenths and the total taking and resetting mechanism of a counter wheel adapted to add in sixths is illustrated diagrammatically in Fig. 14. In using fractions on tabulating machines it is customary to punch the numerators only on the record cards; for example, five-sixths would be represented by a punching in the five index point position of a certain card column which is selected to represent sixths. It is obvious then that the five is the highest index point position which would ever be punched in connection with sixths. The sixths fraction wheel is properly geared to the counter shaft so that if its clutch were thrown in at the six index point position of the machine it would make a complete revolution while the analyzing brush was moving from the six to the zero index point positions on a card. In other words the gear ratio of the six fraction wheel bears the proportion six to ten to that of the tenths wheels.

Referring now to Fig. 14, the commutator 80a is shown corresponding to commutator 80 in the other figures. An outer brush 81a and an inner brush 84a correspond to the brushes 81 and 84 of the other figures. The outer commutator segments designated from zero to five are evenly spaced about the periphery of the commutator while the inner segments designated from zero to five are given the usual tenth spacing, the first four positions on the inner commutator surface being left blank on the sixths wheel commutator. As before, corresponding segments on the inner and outer surfaces of the commutator are connected to each other. The wheels accumulate in the usual manner and the position of the brush 81a always corresponds to the position of the counter wheel. When total taking is desired the counter wheel and the brush 81a are driven through one complete revolution from which it will be understood that the energizing pulse for the counter magnet occurs at the proper time to permit this wheel with its particular gear ratio to complete one revolution before its clutch is kicked out by the common clutch kick out plate of the machine. This means that the usual type bars have risen to present the six type in printing position at the time the outer brush 81a starts its revolution. The type continues its upward motion and moves from one printing position to the next while the brush 81a is moving from one outer commutator segment to the next adjacent one. When the brush 81a reaches the zero commutator segment a circuit will be established through the outer brush 81a and the inner brush 84a to energize the printing call magnet and the resulting pulse of current energizes this magnet at the proper time to select the type for printing which corresponds to the original position of the counter wheel and the brush 81a. This will be clear from the specific example. Consider that the sixths counter wheel registers "three", meaning that the brush 81a is resting on outer commutator segment 3. As the sixth type reaches printing position brush 81a starts to rotate and moves from the three to the four commutator segments while the type bar is moving from the six to the five printing position; the brush moves from the 4 to the 5 commutator segment while the type bar is moving from the five to the four printing position and the brush moves from the five to the zero commutator segment while the type bar is moving from the four to the three printing position. The brush on reaching the zero commutator segment, of course, establishes the printing circuit and selects the three type for printing. Other fractional numerators are printed in a similar manner.

Resetting is effected by rotating the brush 84a, this brush rotating in synchronism with the brushes 84 from which it follows that the same clutching and unclutching mechanism may be used for this brush as is used for all the inner or resetting brushes on the machine. In connection with the sixths wheel, of course, the last five positions only of the brush 84a can enter into the resetting operation. The brush 84a on reaching the inner segment which is connected to that on which the outer brush 81a is resting at the time establishes a circuit through the counter magnet of the sixth counter wheel causing the brush 81a together with the associated counter wheel to rotate in an advance direction. Owing to the different gear ratios, of course, the brush 81a moves from one outer commutator segment to the next while the brush 84a is moving from one inner commutator segment to the next. If the outer brush 81a stands on the 1 commutator segment, for example, a circuit will be established through its counter magnet when the inner brush 84a reaches the inner commutator segment 1. The outer brush with its counter wheel then rotates and covers its commutator segments in order until it reaches zero position, its movement, on account of the different gear ratio corresponding to the movement of the inner brush past corresponding inner segments. Thus the outer brush always reaches its zero position at the same time that the inner brush reaches its zero position and the common clutch kick out plate kicks out the clutches of both at this point leaving both at zero.

The invention has now been explained in connection with an exemplary embodiment which at the present time is believed to be its preferred form but it will be understood that many modifications will readily occur to those skilled in the art, for example, all or a part of the electrical features may be replaced with corresponding mechanical ones without departing from the spirit of the invention. I intend therefore to be limited only by the scope of the following claims:

1. An accounting machine including a plurality of accumulating elements each individual to a denominational order, resetting means for initiating a reset operation on said elements at differential times and for terminating the reset operation on all elements involved simultaneously and selective means for operatively associating any individual denominational order elements with said resetting means for reset.

2. An accounting machine including a plurality of accumulating elements each individual to a denominational order, means for driving said elements in the same direction for entering items therein and for resetting them, means for initiating a resetting operation on said elements at differential times and for terminating the resetting operation on all elements involved simultaneously and selective means for operatively associating any individual denominational order elements with said resetting means for reset.

3. An accounting machine including a plurality of accumulating elements individual to denominational orders, resetting means for said elements including means for initiating resetting operations independently on each element and a common member for terminating the resetting operations on all elements involved and means for selecting any individual denominational order elements for reset.

4. An accounting machine including a plurality of accumulating elements individual to denominational orders, resetting means for said elements including means for initiating resetting operations on said elements at differential times and a common member for terminating a resetting operation simultaneously on all elements involved and selective means for operatively associating any individual denominational order elements for reset.

5. An accounting machine including a plurality of accumulating elements, means for initiating operation of said elements at differential times for entry of items thereon, means for initiating reset operations on said elements at differential times and common means for terminating both entering and reset operations on all elements involved simultaneously.

6. An accounting machine including a plurality of accumulating elements and a driving clutch mechanism for each, means for effecting clutching action of said clutch mechanism at differential times for entering items and for resetting said means including common clutch operating devices for both operations and common means for effecting unclutching of said clutch mechanism for terminating both entering and resetting operations on said elements.

7. An accounting machine including a plurality of accumulating elements and a driving clutch mechanism for each, means for effecting clutching action of said clutch mechanism for entering items and for resetting said means including common clutch operating devices for both operations and common means for effecting unclutching of said clutch mechanism for terminating both entering and resetting operations on all elements involved simultaneously.

8. An accounting machine including a plurality of accumulating elements and a driving clutch mechanism for each, means for effecting clutching action of said clutch mechanism at differential times for both entering items and resetting said means including common clutch operating devices for both operations and common means for effecting unclutching action of said clutch mechanism for terminating both entering and resetting operations on all elements involved simultaneously.

9. An accounting machine including a plurality of accumulating elements individual to denominational orders, totaling mechanism associated therewith, resetting means for said elements for initiating reset at differential times and terminating it simultaneously on all elements involved, means for calling said totaling mechanism into operation, means for calling said resetting means into operation and common controlling means for both of said calling means whereby a resetting operation is effected whenever a totaling operation occurs and means for selectively associating any denominational order accumulating element with said resetting means whereby totaling may be effected in connection with any denominational order elements with or without reset of the same.

10. An accounting machine including a plurality of accumulating elements individual to denominational orders, totaling means including a plurality of printing devices also individual to denominational orders and means for selectively associating any printing device with any accumulating element, resetting means for said elements for initiating reset at differential times and terminating it simultaneously on all elements involved, means for calling said totaling means into operation, means for calling said resetting means into operation and common controlling means for both of said calling means whereby a resetting operation is effected whenever a totaling operation occurs and means for selectively associating any denominational order accumulating element with said resetting means whereby totaling may be effected from any desired denominational order elements with or without reset of the selected elements.

11. An accounting machine including an accumulator, a printing device associated therewith, means controlled by the accumulator for controlling said printing device to list the items entered into the accumulator and total taking means for operating said printing device to print a total standing on the accumulator said total taking means including the listing control operating means controlled by the accumulator.

12. An accounting machine including an accumulator and an associated printing device, electrical operating mechanism for said printing device, a control circuit therefor including contacts operated by the accounting device on receiving an entry for effecting listing of the entry, total taking means for controlling said printing device to print a total standing on the accumulator and a control circuit for said total taking device including the contacts operated by the accumulator.

13. An accounting machine including a plurality of accumulating devices individual to denominational orders and printing mechanism associated therewith, means controlled by said accumulators for effecting listing of entered items and means for effecting total printing from said accumulator and including said listing control devices and means for selectively listing, total printing or both on any denominational orders.

14. An accounting machine including a plurality of accumulating devices individual to denominational orders and printing mechanism associated therewith, means controlled by said accumulators for effecting listing of entered items by the printing mechanism and means for effecting total printing controlled by said accumulator and including said listing control device and selective means for effecting total printing on any denominational order.

15. An accounting machine including an accumulating device and associated printing device, means for controlling said accumulator during certain machine cycles for entering items therein and means controlled by the accumulator for listing during such cycles, means for controlling the printing mechanism for total printing controlled by said accumulator, means for resetting the accumulator, common driving mechanism for the printing mechanism during total printing and for the resetting means, means for operating the driving mechanism automatically through a plurality of machine cycles to drive the resetting means subsequent to the total taking means, and means controlled by the machine for automatically selecting the listing, totaling and reset devices respectively during predetermined separate cycles of machine operation.

16. An accounting machine including accumulating devices comprising rotatable counter elements for receiving and accumulating items, transfer devices for transferring from lower to higher elements, total taking means comprising mechanism for rotating said elements through a complete revolution, means operated by the machine for automatically disabling the transfer mechanism during total taking operations, resetting means for restoring the elements to zero position and common driving mechanism for the total taking means and the resetting means with means for operating the same to first operate said total taking means and subsequently automatically operate said resetting means.

17. An accounting machine including an accumulator comprising a rotatable entry receiving element, total taking mechanism associated with said accumulator comprising a commutator and a coacting brush with means for rotating it in synchronism with the rotation of the counter element, means for rotating said counter element and said brush through a complete cycle for total taking and electrical means operable when said brush reaches a predetermined position on the commutator for manifesting the total originally standing on the accumulator.

18. An accounting machine including an accumulating device comprising a rotatable element for registering items, total taking mechanism comprising a brush rotatable with said rotatable element, a commutator with which said brush cooperates, a second brush cooperating with said commutator, means for rotating said counter element and said first named brush through a complete cycle of operation for total taking and reset means including mechanism for rotating said second brush through a complete cycle of operation.

19. An accounting machine including an accumulating element comprising a rotatable counter element, a brush rotatable with said rotatable element and a commutator coacting with said brush, a second brush cooperating with said commutator, total taking mechanism comprising means for driving said counter element and said first named brush through a complete cycle of operation and means controlled by both of said brushes when they engage a common commutator segment for manifesting a total during the operation of the total taking mechanism, resetting means comprising mechanism for rotating said second named brush through a complete cycle of operation and means controlled by the two brushes on reaching a common commutator segment for effecting reset of said counter element.

20. An accounting machine including an accumulator, a driving shaft therefor rotatable in one direction only, common means for coupling said accumulator to said shaft for entry receiving and resetting operations and separate means for driving said shaft during entering and resetting operations.

21. An accounting machine including accumulating devices, a counter shaft and means for coupling said elements to said counter shaft at differential times and uncoupling them therefrom simultaneously and means for coupling said accumulators to said shaft at differential times and uncoupling them therefrom simultaneously for resetting and separate driving devices for driving said shaft during entering and resetting operations.

22. An accounting machine including an accumulator and an associated recording device, electrical operating mechanism for said recording device, a control circuit therefor including contacts operated by the accounting device on receiving an entry for controlling the recording device to record the entry, means for controlling the recording device to record the data standing on the accumulator and a control circuit for said last named controlling means including the contacts operated by the accumulator.

23. In an accounting machine which has a plurality of individual denominational order accumulator elements and devices for selectively associating them together to form banks consisting of any desired accumulator elements in any desired order, a reset mechanism comprising means normally dissociated from the accumulator elements for initiating reset at differential times depending on the initial readings of elements to be reset, means for selectively and individually connecting said means to the several accumulator elements for resetting a formed bank of elements and means for terminating the reset operation simultaneously on all elements connected to the reset mechanism.

24. In an accounting machine which has a plurality of individual denominational order accumulator elements with means for selectively associating them together to form banks consisting of any desired accumulator elements in any desired order, reset mechanism normally dissociated from said elements comprising a plurality of individual denominational order devices each for initiating a reset operation on an accumulator element at differential times depending on its original setting, selective means for individually connecting said devices with accumulator elements for initiating reset on a formed accumulator bank and a common member for terminating resetting operations simultaneously on all accumulator elements connected to said devices.

25. In an accounting machine which includes a plurality of denominational order accumulator devices, a total taking and reset mechanism comprising elements individually settable by the several accumulator devices in accordance with their readings, recording devices and means cooperating with said elements for controlling the recording devices to record totals, means cooperating with said elements for initiating reset of the accumulator devices at differential times according to their readings and means for terminating reset on all devices involved simultaneously.

26. In an accounting machine which includes a plurality of denominational order accumulator devices, a total taking and reset mechanism comprising elements individually settable by the several accumulator devices in accordance with their readings, recording devices and means cooperating with said elements for controlling the recording devices to record totals and means automatically called into operation at the termination of a total taking operation and cooperating with said elements for initiating reset of the accumulator devices at differential times according to their readings and means for terminating reset simultaneously on all elements involved.

27. In an accounting machine which includes a plurality of denominational order accumulator wheels, a total taking and reset mechanism comprising elements individually settable by the several accumulator wheels in accordance with their reading, recording devices, means for effecting a complete cycle of operation of said wheels and mechanism controlled by said elements as the wheels individually pass zero position to effect operation of the recording devices, means controlled by said elements for initiating reset of said wheels at differential times according to their individual readings and means for terminating reset simultaneously on all wheels involved.

28. In an accounting machine which includes a plurality of denominational order accumulator wheels, a total taking and reset mechanism including drive mechanism for the wheels, elements individually settable by the several accumulator wheels according to their readings, recording devices, sequentially operating means for first coupling the wheels to the driving mechanism for a full cycle of operation and thereafter for a partial cycle, means cooperating with the settable elements for controlling the recording devices to record totals when the wheels pass through zero position on their complete cycle of operation, means for cooperating the settable elements for effecting the coupling of the several wheels at differential times according to their readings for their partial cycles of operation and means for terminating the driving connection simultaneously for all wheels involved to fix the final position of the wheels at the completion of the entire operation.

29. In an accounting machine which has a plurality of individual denominational order accumulator devices, a total taking and reset mechanism comprising elements individually settable by the several accumulator devices according to their readings, recording devices and means cooperating with said elements for controlling the recording devices to record totals, means cooperating with said elements and controlled in accordance with the settings thereof for initiating reset of the accumulator devices at differential times and a common member for terminating reset on all elements involved simultaneously.

30. An accounting machine including an entry receiving device, combined reading out and resetting means comprising driving mechanism with means for operating the same through a complete cycle of operation, means driven by the driving mechanism during the first portion of its operating cycle for driving said entry receiving device through a complete cycle and means for picking the original entry therefrom while the entry receiving device is in motion and means driven by the driving mechanism during the later portion of its operating cycle for resetting the entry receiving device to home position.

31. An accounting machine including an accumulator having a rotatable entry receiving element, combined total taking and reset means comprising driving mechanism with means for operating the same through a complete cycle of operation, means driven by the driving mechanism during the first portion of its operating cycle for driving said rotatable element through a complete revolution and means for picking a total from the element while it is in motion, and means driven by the driving mechanism during the later portion of its operating cycle for rotating said rotatable element through part of a revolution to bring it to home position.

32. An accounting machine including an accumulating device having a movable entry receiving element combined total taking and reset means comprising driving mechanism with means for operating the same through a complete cycle of operation, means driven by said driving mechanism during the first part of its operating cycle to drive said movable element through a complete cycle restoring it to its original position, means for picking a total from the element while it is in motion, means driven by said driving mechanism during the later part of its operating cycle to drive said movable element through a portion only of its cycle to restore it to home position and means for selectively associating the element with the resetting means during the operation of the same.

33. An accounting machine including an accumulating device having a movable entry receiving element, combined total taking and reset means comprising driving mechanism with means for operating the same through a complete cycle of operation, total picking means driven by said driving mechanism during the first part of its operating cycle adapted to drive said movable element through a complete cycle and to pick the total from the same while it is in motion, resetting means driven by said driving mechanism during the later part of its operating cycle adapted to drive said movable element through a portion of a cycle to return it to home position and selective means for independently selectively associating the total picking means and the resetting means with said movable entry receiving element.

34. An accounting machine including a plurality of accumulating elements individual to denominational orders, total recording mechanism associated therewith, resetting means for said elements for initiating reset at differential times and terminating it simultaneously on all elements involved, common driving mechanism for said recording mechanism and resetting means with provisions for first operating the recording mechanism and subsequently necessarily operating the resetting means and selective means for selectively associating the accumulating elements with the reset means to effect recording of data thereon with or without reset.

35. An accounting machine including accumulating devices individual to denominational orders and associated recording mechanism, total taking means for effecting operation of the recording mechanism under control of the accumulating devices to record data standing on the latter, resetting mechanism for resetting said accumulators, common driving mechanism for said total taking means and said reset mechanism including means for first driving the total taking means and subsequently necessarily driving the reset mechanism and selective means for selectively associating any of said accumulating devices with the total taking means and any of said devices with the reset mechanism to control recording by and reset of said devices during the respective operations.

36. An accounting machine including accumulating devices individual to denominational orders and associated printing mechanism, means for effecting total printing controlled by the accumulators, reset mechanism for resetting said accumulators, common driving mechanism for said total printing and reset mechanism with means for operating the same automatically through successive machine cycles, means for driving said total taking means from the driving mechanism during one machine cycle, means for driving said resetting means from said driving mechanism during a subsequent machine cycle, and selective means for rendering any of said accumulating devices operative to total print or reset during the respective cycles.

In testimony whereof I hereto affix my signature.

JAMES W. BRYCE.